(12) United States Patent
Yao

(10) Patent No.: US 7,522,785 B2
(45) Date of Patent: Apr. 21, 2009

(54) MEASUREMENTS OF POLARIZATION-DEPENDENT LOSS (PDL) AND DEGREE OF POLARIZATION (DOP) USING OPTICAL POLARIZATION CONTROLLERS

(75) Inventor: X. Steve Yao, Diamond Bar, CA (US)

(73) Assignee: General Photonics Corporation, Chino, CA (US)

( * ) Notice: Subject to any disclaimer, the term of this patent is extended or adjusted under 35 U.S.C. 154(b) by 51 days.

(21) Appl. No.: 11/291,585

(22) Filed: Nov. 30, 2005

(65) Prior Publication Data

US 2006/0115199 A1    Jun. 1, 2006

Related U.S. Application Data

(60) Provisional application No. 60/632,579, filed on Dec. 1, 2004.

(51) Int. Cl.
G02B 6/00 (2006.01)
(52) U.S. Cl. .................. 385/11; 385/14; 385/147; 356/364
(58) Field of Classification Search .......... 385/11, 385/14, 147; 359/483; 356/351, 364–370, 356/453, 491
See application file for complete search history.

(56) References Cited

U.S. PATENT DOCUMENTS

| | | | |
|---|---|---|---|
| 5,561,726 A | 10/1996 | Yao | |
| 5,796,510 A | 8/1998 | Yao | |
| 5,978,125 A | 11/1999 | Yao | |
| 6,144,450 A * | 11/2000 | Jopson et al. | ............... 356/364 |
| 6,373,614 B1 | 4/2002 | Miller | |
| 6,480,637 B1 | 11/2002 | Yao | |
| 6,493,474 B1 | 12/2002 | Yao | |
| 6,576,886 B1 | 6/2003 | Yao | |
| 6,628,850 B1 | 9/2003 | Yao | |
| 6,628,861 B1 | 9/2003 | Yao | |
| 6,628,862 B1 | 9/2003 | Yao | |
| 6,754,404 B2 | 6/2004 | Yao | |
| 6,795,616 B2 | 9/2004 | Yao | |
| 6,836,327 B1 | 12/2004 | Yao | |
| 6,873,783 B1 | 3/2005 | Yao | |
| RE38,735 E | 5/2005 | Yao | |
| 6,937,798 B1 | 8/2005 | Yao et al. | |
| RE38,809 E | 10/2005 | Yao | |
| 6,975,454 B1 | 12/2005 | Yan et al. | |
| 7,027,198 B2 | 4/2006 | Yao | |
| 7,067,795 B1 | 6/2006 | Yan et al. | |
| 7,154,659 B1 | 12/2006 | Yao et al. | |
| 7,157,687 B1 | 1/2007 | Yao | |
| 7,218,436 B2 | 5/2007 | Yao | |
| 7,227,686 B1 | 6/2007 | Yan et al. | |
| 7,233,720 B2 | 6/2007 | Yao | |
| 7,265,836 B1 | 9/2007 | Yao | |
| 7,265,837 B1 | 9/2007 | Yao | |
| 7,343,100 B2 | 3/2008 | Yao | |
| 7,372,568 B1 | 5/2008 | Yao | |

(Continued)

Primary Examiner—Kevin S Wood
(74) Attorney, Agent, or Firm—Fish & Richardson P.C.

(57) ABSTRACT

Devices and techniques that use a polarization controller and a feedback control to the polarization controller to systematically control the polarization of light output from the polarization controller in measuring the polarization dependent loss (PDL) of an optical device or material that receives the light from the polarization controller or the degree of polarization (DOP) of a light beam directed into the polarization controller.

12 Claims, 5 Drawing Sheets

U.S. PATENT DOCUMENTS

| | | |
|---|---|---|
| 2003/0081874 A1 | 5/2003 | Yao |
| 2004/0037495 A1 | 2/2004 | Yao |
| 2005/0041922 A1 | 2/2005 | Yao |
| 2005/0168659 A1 | 8/2005 | Melton |
| 2005/0200941 A1 | 9/2005 | Yao |
| 2005/0201751 A1 | 9/2005 | Yao |
| 2005/0265728 A1 | 12/2005 | Yao |
| 2006/0023987 A1 | 2/2006 | Yao |
| 2007/0223078 A1 | 9/2007 | Yao et al. |
| 2007/0297054 A1 | 12/2007 | Yao et al. |
| 2008/0030839 A1 | 2/2008 | Yao |
| 2008/0054160 A1 | 3/2008 | Yao |

* cited by examiner $$PDL = 10 \log_{10} \left( \frac{P_{max}}{P_{min}} \right)$$

Sample #1
- Ave PDL 2.653dB
- Min PDL 2.478dB (-6.6%)
- Max PDL 2.693dB (+1.5%)

Sample #2
- Ave PDL 0.699dB
- Min PDL 0.668dB (-4.4%)
- Max PDL 0.712dB (+1.3%)

Low PDL sample: APC connector

High accuracy: 0.005 dB
High repeatability: 0.005 dB

High PDL sample: Polarizer

» Wavelength scan and multiple (12) scan repeatability

DOP meter based on the active maximum and minimum search method.

Additional applications of DOP meters. Upper: PMD or OSNR monitoring in networks. Bottom: Noise figure measurement of amplifiers.

MEASUREMENTS OF POLARIZATION-DEPENDENT LOSS (PDL) AND DEGREE OF POLARIZATION (DOP) USING OPTICAL POLARIZATION CONTROLLERS

This application claims the benefit of U.S. Provisional Patent Application No. 60/632,579 entitled "Measurements of Polarization-Dependent Loss (PDL) and Degree of Polarization (DOP) Using Optical Polarization controllers" and filed Dec. 1, 2004.

BACKGROUND

This application relates to optical polarization devices and measurements of polarization-dependent loss (PDL) and degree of polarization (DOP).

Optical polarization is an important parameter of a light beam or an optical signal. Polarization-dependent effects in fibers and other devices, such as polarization-dependent loss (PDL) and polarization-mode dispersion (PMD), can have significant impacts on performance and proper operations of optical devices or systems. Hence, it may be desirable to measure and monitor the state of the polarization (SOP), the PDL and the DOP of an optical signal.

SUMMARY

This application describes, among others, various implementations and examples of devices and techniques that use a polarization controller and a feedback control to the polarization controller to systematically control the polarization of light output from the polarization controller in measuring the polarization dependent loss (PDL) of an optical device or material that receives the light from the polarization controller or the degree of polarization (DOP) of a light beam directed into the polarization controller.

One example of devices described here includes a polarization unit to control a polarization of light received by the polarization unit in response to a control signal, wherein the light from the polarization unit passes through an optical medium; an optical detector to receive light transmitted through the optical medium and to produce a detector output; and a feedback unit that receives the detector output and, in response to the received detector output, produces the control signal to control the polarization unit to adjust the polarization of light to the optical medium to measure a maximum transmission through the optical medium and a minimum transmission through the optical medium at the optical detector.

As another example, this application describes a device which includes a polarization unit to receive an input beam of light and to control a polarization of the received input beam in response to a control signal; an optical polarizer placed to receive light output from the polarization unit to produce an optical output; an optical detector to receive the optical output from the optical polarizer and to produce a detector output; and a feedback unit that receives the detector output and, in response to the received detector output, produces the control signal to control the polarization unit to adjust the polarization of light to the optical polarizer to measure a maximum transmission and a minimum transmission at the optical detector.

This application also describes methods of optical measurements. In one example, a method is described to include separating a plurality of WDM channels into separated signals; directing the separated WDM channels, one at a time, into a device that measures a degree of polarization of light; and measuring the degree of polarization of light of each separated WDM channel by using the device.

In another example, a method is described to include directing light from a light source through an optical bandpass filter to produce a reference light beam; measuring a first degree of polarization of the reference light beam output from the optical bandpass filter; and using the first degree of polarization to compute a first optical signal to noise ratio. This method also includes directing the light from the light source through an optical amplifier first and then through the optical bandpass filter; and measuring a second degree of polarization of light output from the optical bandpass filter; using the second degree of polarization to compute a second optical signal to noise ratio. This method further includes using the first degree of polarization and the second degree of polarization to determine a noise figure of the optical amplifier.

These and other implementations and applications are described in greater detail in the attached drawings, the detailed description, and the claims.

DETAILED DESCRIPTION

Polarization dependent loss (PDL) is the total range of insertion loss of light after transmitting through an optical medium (e.g., a device or a material) due to changes in polarization from the original SOP before entry of the optical medium (the launch state). Hence, PDL can be expressed as:

$$PDL = 10 \log_{10}(P_{max}/P_{min}) \quad (1)$$

where Pmax and Pmin are maximum and minimum transmission powers of light through the device or medium for all possible input polarizations.

Figure 1:
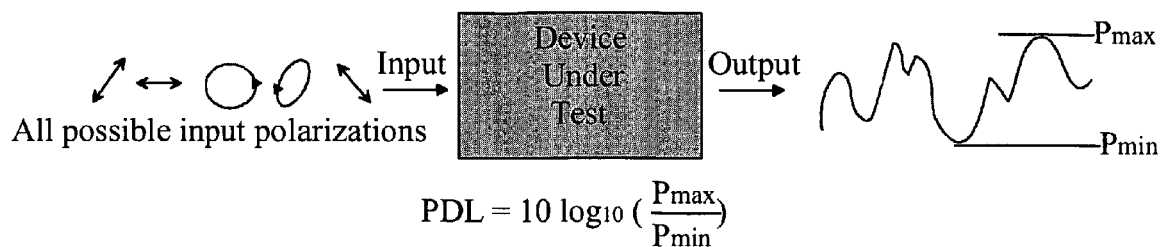
FIG. 1 shows a detection device which measures PDL of an optical medium such as an optical device or an optical material.

FIG. 1 illustrates a typical system for measuring the PDL of an optical material or device under test (DUT). The SOP of the input light is changed through all possible SOPs and the power of the optical transmission through the DUT is measured to obtain the maximum transmission power (Pmax) and the minimum transmission power (Pmin). Based on the measured Pmax and Pmin, the PDL can be computed from Eq. (1). TABLE I lists PDL values for some fiber optic components.

Various techniques were developed to implement the system in FIG. 1. For example, an optical polarization scrambler may be placed in the optical path of the input light before the DUT to scramble the input SOP to cover as many SOPs as possible. An optical detector is used to receive the transmitted light and measure the transmission power. This process can be slow because the polarization scrambler needs to operate at various settings to generate all possible SOPs and the accuracy of the measurement generally increases with the measurement time. Notably, many polarization scramblers have the uncertainty whether the SOP is truly scrambled so that all possible SOPS on the Poincare Sphere are covered. Such polarization scramblers may have uncovered SOP areas on the Poincare Sphere. This uncertainty compromises the trustworthiness of the measured maximum and minimum transmission power Pmax and Pmin. In addition, the polarization scrambling method is known for its inaccuracy for measuring devices or media with high PDL values.

Figure 2:
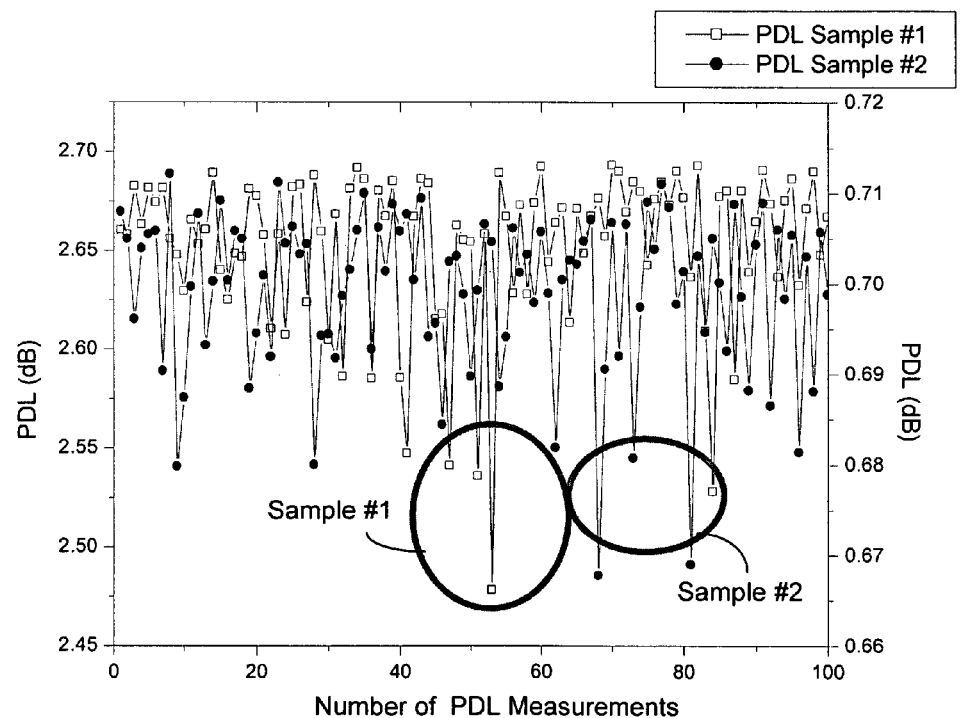
FIG. 2 shows examples of PDL measurements of two samples using polarization scrambling.

FIG. 2 shows 100 measurements of two PDL samples using the polarization scrambling method. The measured PDL values fluctuate from measurement to measurement. The minimum measured PDL deviates from the averaged PDL by 6.6% and 4.4% in the two samples tested. Such inaccuracies may be unacceptable in certain applications.

TABLE I

PDL values of Some Fiber Optic Components

| Component | PDL (dB) |
|---|---|
| Single-mode fiber: (1.0 m) | <0.02 |
| (10 km) | <0.05 |
| Optical connector: (Straight) | 0.005-0.02 |
| (Angled) | 0.02-0.06 |
| 50/50 coupler: (Single wavelength) | 0.1-0.2 |
| (1300/1500 nm) | 0.15-0.3 |
| 90/10 coupler: (through path) | 0.02 |
| (−10 dB path) | 0.1 |
| Directional Isolator | 0.05-0.3 |
| Three port circulator | 0.1-0.2 |
| DWDM multiplexer | 0.05-0.1 |

Another method for measuring PDL of a device or medium measures the elements of the Muller polarization matrix by changing the input SOP to 4 different SOPs, such as a set of 4 SOPs of linear polarization states at 0, 45, and 90 degrees, and one circularly polarized state. The PDL is then computed from the Muller matrix elements. To compute the Muller matrix elements, the optical power is first measured without the medium or device under test to obtain a reference for the incident power. Next, the incident polarization is changed to the four selected SOPs and the optical transmission power levels through the medium or device under tests are measured for each of the four selected SOPs. Based on the above measurements, the four Muller matrix elements can be computed.

Figure 3:
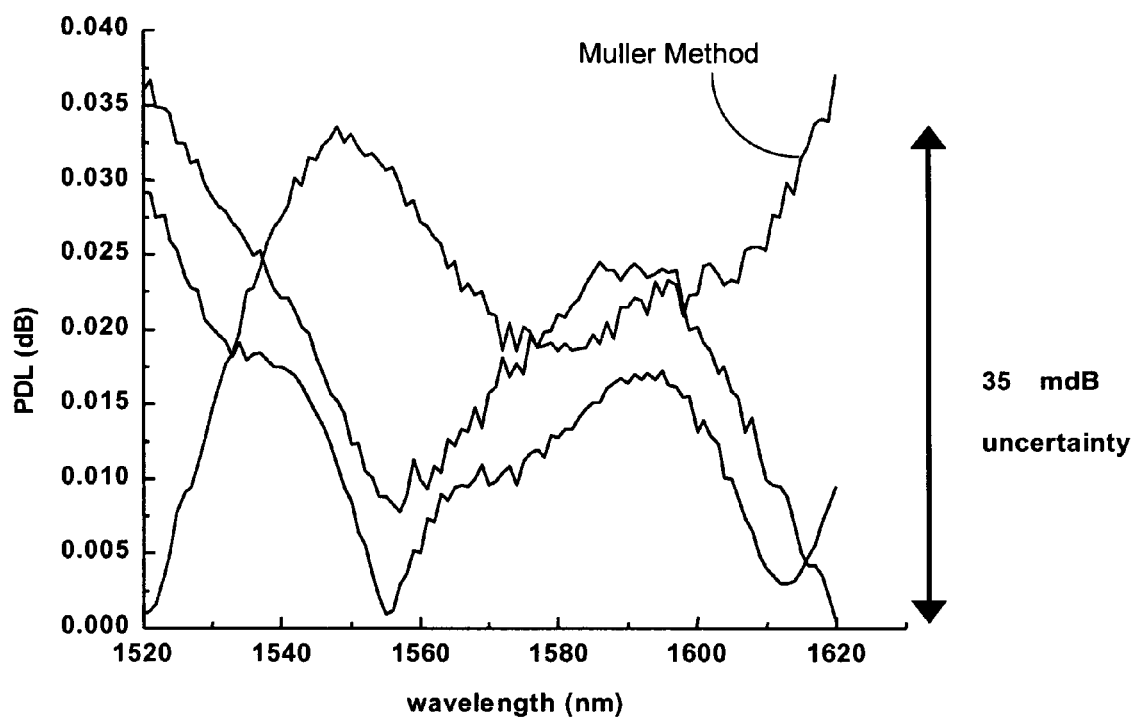
FIG. 3 shows one example of a PDL measurement with the Muller matrix method over a spectral range from 1520 nm to 1620 nm.

The above Muller matrix method for measuring PDL is slow and may take about several seconds per power measurement. The Muller matrix elements vary with the optical wavelength and hence wavelength calibration is needed. In addition, the Muller matrix method tends to be inaccurate. FIG. 3 shows one example of a PDL measurement with the Muller matrix method over a spectral range from 1520 nm to 1620 nm. The measured PDL changes with the wavelength with a uncertainty of about 35 mdB. This magnitude of measurement uncertainty may be unacceptable in some applications.

The technique for the described implementations for measuring PDL is in part based on the recognition of the above and other limitations of the aforementioned techniques using the polarization scrambler and the Muller matrix. Different from the above techniques where the control of the input SOP to the medium or device under test is entirely independent from the light received by the detector that measures the optical transmission from the medium or device under test, the present technique adjusts the input SOP in response to the optical power of the optical transmission through the device or medium that is received by the optical detector. A feedback control is implemented to adjust the incident SOP in search for the maximum and the minimum optical transmission power levels through the optical medium (a material or device) under test. This feedback controlled search is systematic and deterministic and removes the uncertainty in the polarization scrambling method and the wavelength calibration in the Muller matrix method. The present technique further provides high speed measurements with high accuracy.

Figure 4:
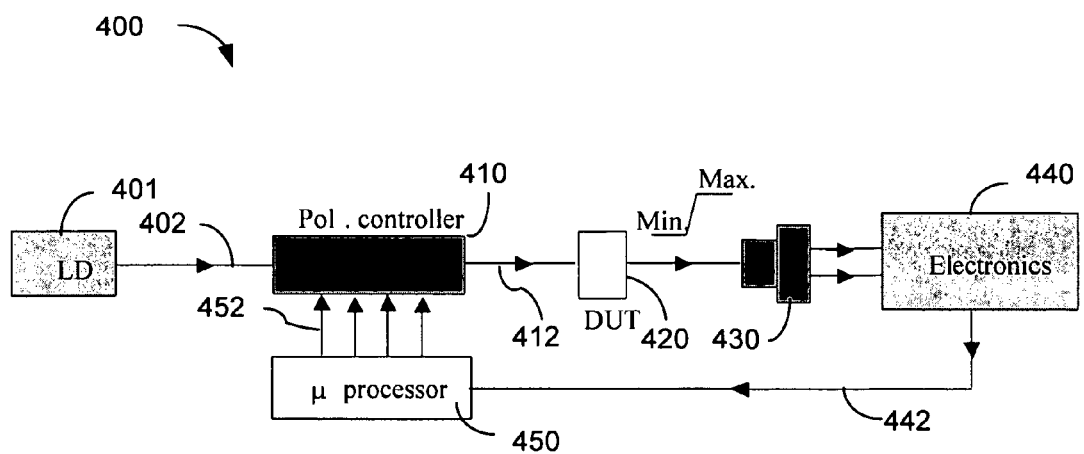
FIG. 4 shows one implementation of a device which measures the PDL of an optical medium using a feedback control of a polarization controller based on a maximum-and-minimum search described in this application.

FIG. 4 shows a system 400 for measuring PDL of an optical medium or device under test 420. A sample holder may be used to hold the medium or device 420 in place along the optical path of the system 400. A light source 401, such as a laser (e.g., a diode laser) is used to produce a probe beam 402. An optical polarization controller 410 with multiple adjustable polarization elements may be used to control the polarization of the probe beam 402 and produce a probe beam 412 that reaches and transmits through the medium or device 420. The adjustable polarization elements in the polarization controller 410 are adjusted to produce the desired incident SOP in response to the power of the optical transmission through the medium or device 420. An optical detector 430, such as a photodiode, may be used to collect the optical transmission through the medium or device 420 and produce a detector output indicative of the power of the optical transmission. An detector circuit 440 may be used to condition and process the detector output from the detector 430 and produce a feedback signal 442. A feedback controller 450, which may include a microprocessor ("µ processor") or a digital control circuit, is provided to receive the feedback signal 442 and to control the polarization controller 410 based on the measured power level of the optical transmission for the previous incident SOP to adjust the SOP in order to search for the Pmax and Pmin. In this example, the feedback control for the device 400 includes the units 440, 442 and 450.

In implementations, the feedback controller 450 may be programmed to carry out the search by controlling the polarization controller 410 based on the received power at the optical detector 430. As one example, a maximum-and-minimum search algorithm may be used to control the search. First, the polarization controller 410 is set to produce a selected initial SOP in the probe beam 412. The power of the optical transmission is measured. Next, the polarization controller 410 is controlled to change the SOP along a path on the Poincare Sphere to a new SOP. The power of the optical transmission at the new SOP is measured. The power either decreases or increases at the new SOP. As a specific example, assuming that the optical power decreases at the new SOP, the polarization controller 410 is controlled to continue to change the SOP along that path on the Pincare Sphere until the measured optical power no long decreases and begins to increase. This step finds the first minimum optical transmission. Next, the polarization controller 410 is controlled to continue along the same path to find the SOP with the first maximum optical transmission. Such search continues and the largest optical transmission is used as the Pmax and smallest optical transmission is used as the Pmin. The search steps may be reduced and the search path may be modified or altered to improve the search for Pmax and Pmin.

The polarization controller 410 may be include multiple adjustable polarization elements that change the polarization of light. One way of adjusting the polarization elements is to repetitively adjust one element at a time while fixing other elements to search the local maximum or minimum in a iterative manner until a global maximum or minimum is found. As an example, consider a polarization controller 410 with 3 adjustable polarization elements A, B and C. First, the elements A, B and C are set to some initial settings and the search is initiated by adjusting element A while keeping the settings of elements B and C fixed. Assume the element A is adjusted along a path on the Poincare Sphere to increase the optical transmission at the optical detector 430. The element A is adjusted until the optical transmission at the detector 430 begins to decrease. Hence, a local maximum is found. Next, the element B is adjusted to change the polarization of the light on the Poincare Sphere while keeping the settings of elements A and C fixed to find the maximum at the detector 430. After the maximum is found, the element C is adjusted while keeping elements A and B fixed. After the maximum at the detector 430 is found by adjusting the element C, the above process repeated until the newest maximum at the detector 430 no longer increases. At this time, the maximum is said to be found. A similar search process is used to search for the minimum at the detector 430.

Figure 5A:
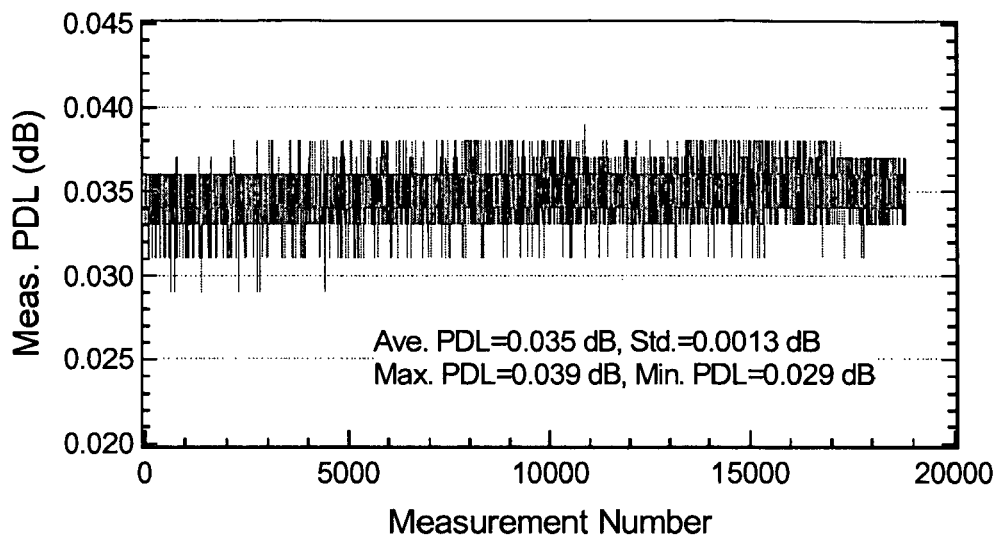
FIGS. 5A, 5B, and 5C show examples of PDL measurements for different sample materials using the system in FIG. 4 based on the maximum and minimum search using the feedback control.
Figure 5B:
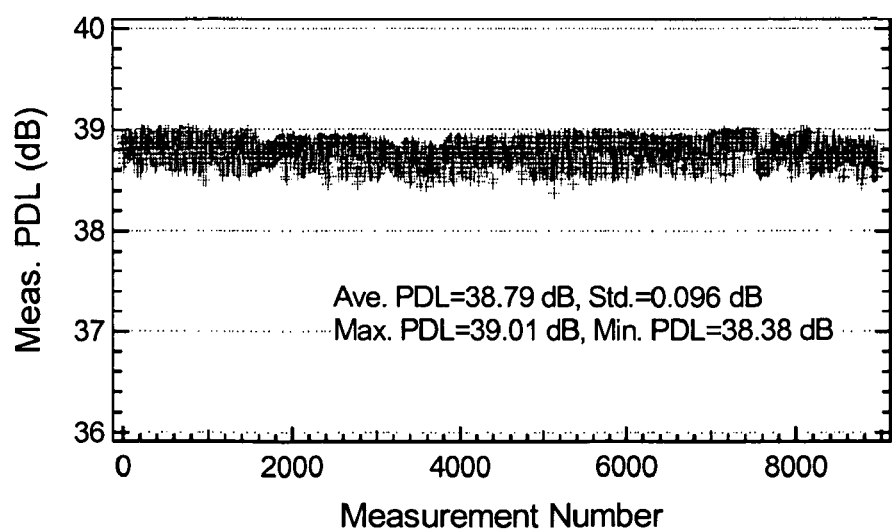
Figure 5C:
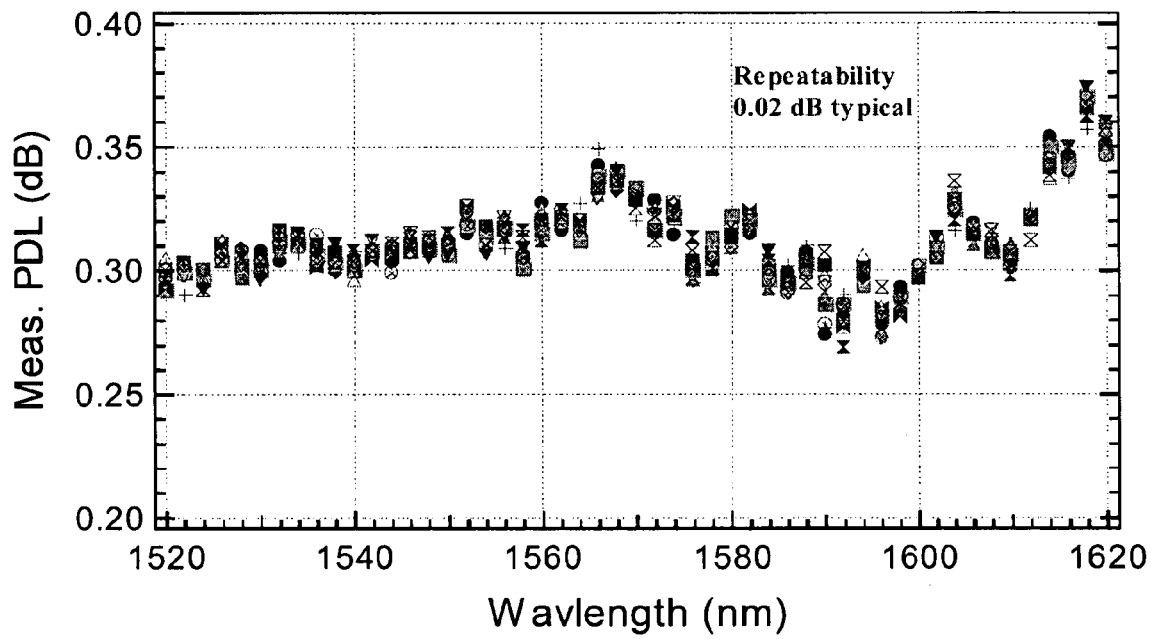

FIGS. 5A, 5B, and 5C show examples of PDL measurements for different sample materials using the system in FIG. 4 based on the maximum and minimum search using the feedback control. FIGS. 5A and 5B show PDL measurements of a low PDL sample and a high PDL sample, respectively. The PDL accuracy of the present technique in one implementation is, e.g., about 0.005 dB, a significant improvement over the accuracy of the polarization scrambling and Muller matrix methods. FIG. 5C shows the repeatability of the present PDL measurement technique over a wavelength range from 1520 nm to 1620 nm.

The above maximum-and-minimum search technique may also be used to measure the degree of polarization (DOP) of a light beam. The degree of Polarization (DOP) is an important property of light sources. DOP directly relates to the accuracy of optical component characterization, the sensitivity of sensor systems, and the quality of optical signals in optical communication systems. Therefore, the accurate and fast characterization of DOP is important in various applications.

In optics, DOP is used to describe how much in the total light power is polarized and is defined as the power in the total polarized portion of the light beam divided by the total optical power (sum of the total polarized portion and the total unpolarized portion):

$$DOP = P_{polarized}/P_{total} = P_{polarized}/(P_{polarized} + P_{unpolarized}) \quad (1)$$

For totally polarized light, DOP is unity. For completely unpolarized light, DOP is zero. DOP of different light sources ranges from 0 to 1. High DOP sources include DFB lasers and external cavity lasers. Such lasers can be incorporated in laser transmitters in telecommunication systems and used as light sources in interferometers and other devices. On the other hand, amplified spontaneous emission (ASE) sources, light emitting diodes (LED), and super-luminescence light emitting diodes (SLED) represent sources with low DOP. Such low DOP sources are important for sensor applications to minimize polarization sensitivity. For example, SLED and ASE sources can be used in a fiber gyro, a rotation sensor for measuring the rate and degree of rotation of an object. Low DOP sources are also attractive for accurate characterization of optical components to remove PDL effects in the measurement system, including polarization sensitivity of photodetectors. Therefore, accurate characterization of DOP of these light sources is extremely important for both optical component manufacturers and users.

Optical amplifiers are critical devices for fiber optic communication and sensing system. One of the important parameter of the amplifiers is the low polarization sensitivity. Unfortunately, both Er+ doped amplifiers and Raman amplifiers have polarization dependent gain (PDG). In particular, if not properly implemented, the PDG of Raman amplifiers can be much stronger than that of Er+ amplifiers.

Raman amplifiers are based on stimulated Raman scattering of optical signals by optical phonons excited by a pump laser in an optical fiber. A weak optical signal is amplified by stimulating the excited phonons to release energy into the signal. This process is called stimulated Raman scattering. PDG is particularly strong for Raman amplifiers because, in stimulated Raman scattering, an incident photon can only stimulate phonon contributed from a pump photon of the same polarization. The Raman gain is the strongest when the polarization of the signal is aligned with that of the pump, but is negligible if the polarization of the signal is orthogonal from that of the pump.

Figure 6A:
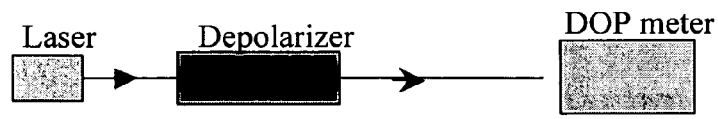
FIGS. 6A and 6B show two exemplary methods to depolarize laser light for pumping a Raman amplifier.

One effective method to minimize the PDG or polarization sensitivity of a Raman amplifier is to pump it with depolarized laser sources. A depolarizer may be used to convert a polarized pump laser from a laser into a depolarized source with a DOP close to zero, as shown in FIG. 6A. The output beam from the depolarizer is then used to pump the Raman amplifier. Such a depolarizer can be made with birefringent crystals, PM fibers, or other methods.

Figure 6B:
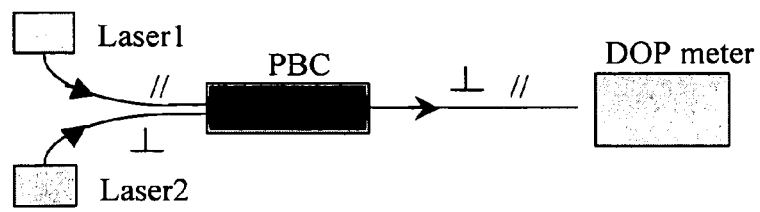

Alternatively, FIG. 6B shows a system where a polarization combiner is used to obtain a nearly unpolarized light beam by combining two laser sources of a similar or identical frequency but with orthogonal polarizations. Because the DOPs of the two laser pump sources directly relate to the polarization sensitivity of the Raman amplifier, accurate characterization of their DOPs is of paramount importance for Raman amplifier manufacturers. For example, the DOP of the combined pump source critically depends on the power balance between the two orthogonally polarized pump lasers and a fast and low cost DOP meter is desirable for the live adjustment of the pump lasers on the manufacturing floor.

DOP may be measured with traditional polarimeter which measures four Stokes parameters S0, S1, S2, and S3. The polarimeter approach is less accurate in measuring low DOP light sources and may be expensive. In addition, the polarimeter approach exhibits wavelength sensitivity, has cumbersome calibration requirements, and can be complicated to operate.

Another commonly used method is the polarization scrambling method in which a polarization scrambler is placed in front of a polarizer and a photodetector to scramble the polarization. Ideally, at some points during the scrambling cycle, the polarized portion of the signal will either be aligned with or orthogonal to the polarizer's passing axis. When aligned, all of the polarized portion passes through and a maximum power level is detected at the photodetector. When orthogonal, the polarized portion is blocked by the polarizer, assuming that the extinction ratio of the polarizer is sufficiently high. Thus, a minimum power level is detected at the photodetector. The difference of $(P_{max} - P_{min})$ equals to $P_{polarized}$ in Eq. (1). On the other hand, the unpolarized portion is not affected by the scrambler. The contribution of this unpolarized portion to the total detected power is constant, but is reduced to one half by the polarizer. Because the contribution of the polarized portion is zero at $P_{min}$, $P_{min}=P_{unpolarized}/2$ The DOP from Eq. (1) then can be calculated as:

$$DOP=(P_{max}-P_{min})/(P_{max}+P_{min}) \qquad (2)$$

Therefore, the maximum and minimum power levels at the photodetector are measured while scrambling the SOP of the incoming signal. Based on such measurements, the DOP of the signal can be determined. However, in order for the method to be practical, the scrambler must be sufficiently fast to cover the whole Poincare Sphere in a short period of time. Second, the scrambler itself must have negligible activation loss (the maximum insertion loss variation during scrambling). In addition, the detection electronics must be fast and accurate enough to faithfully detect the maximum and minimum power levels.

However, no matter how fast and uniform the scrambler is, it is generally difficult to completely cover the Poincare Sphere within a finite time. The uncovered areas on the Poincare Sphere contribute to uncertainty in the DOP measurement. The faster the measurement requires, the larger the uncertainty is. Such uncertainty makes the scrambling method especially less accurate for measuring the light sources of high DOP. However, for low DOP values, the requirement for the coverage on the Poincare Sphere is less stringent and therefore it is more accurate and faster than the polarimeter. In addition, compared with the polarimeter method, the polarization scrambling method has the advantages of wavelength insensitivity, calibration free operation, high power capability, simplicity, and low cost.

Figure 7:
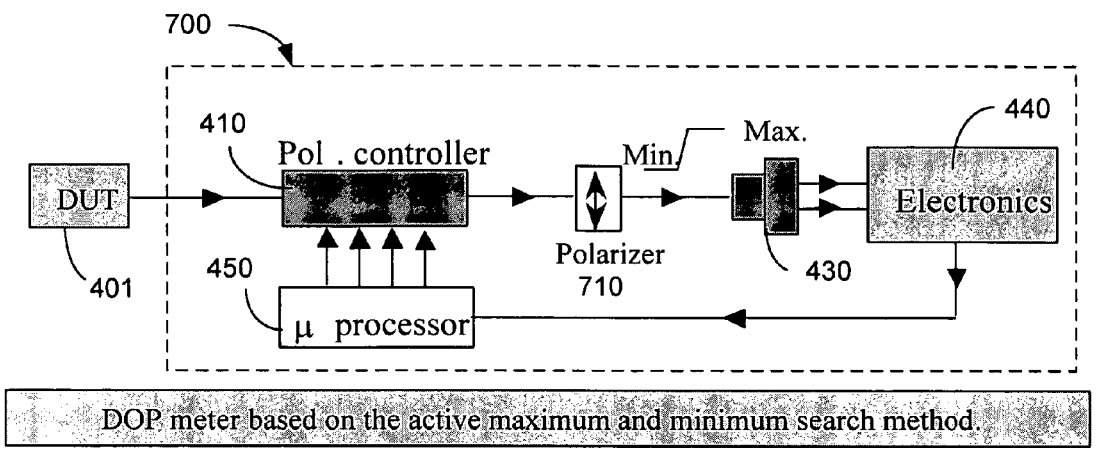
FIG. 7 shows one implementation of a device which measures the DOP of an optical beam using a feedback control of a polarization controller based on a maximum-and-minimum search described in this application.

FIG. 7 shows a DOP meter 700 according to one implementation based on the feedback from the optical detector and the maximum-and-minimum search. A light source such as a laser diode 401 is used to generate the input light beam whose DOP is to be determined. A polarization controller 410 receives the input light and produces an output light beam after controlling the polarization of the light. An optical polarizer 710 is placed in the path of the output light beam from the polarization controller and an optical detector 430 is used to receive the light transmitted through the polarizer 710. A feedback circuit is used to direct the polarization controller 410 to adjust for the maximum and minimum power levels received by the detector 430.

In the device 700, instead of trying to hit the right polarization by luck, as in the scrambling method, the maximum/minimum search method is implemented in the control 450 and assures the instrument to unmistakably find the $P_{max}$ and $P_{min}$ for the DOP calculation in Eq. (2). Because only two points on the Poincare Sphere are required and can be found deterministically and precisely, the measurement speed and accuracy are essentially guaranteed for both low and high DOP sources. Consequently, implementations of such an approach can be used to overcome the shortcomings of both the polarimeter method (less accurate for low DOP values) and the polarization scrambling method (less accurate for high DOP values).

To a certain extent, the maximum/minimum search method is essentially a closed loop polarization scrambling method. This search method substantially eliminates the inaccuracies, but inherits all the advantages of the scrambling methods, including wavelength insensitivity, calibration free operation, high power capability, easy operation, simple construction, and low cost. In addition, this search can also be implemented in a way that achieves a high measurement speed, e.g., less than 0.2 seconds in some implementations.

The optical powers of different light sources can vary dramatically from one to another, ranging from, e.g., microwatts for LEDs to watts for pump lasers. However, typical DOP meters have a dynamic range on the order of 30 dB. Users may specify their intended power range, e.g., from −30 dBm to 0 dBm, or from −10 dBm to 20 dBm. For high power light sources, such as Raman pump lasers with power up to 500 mW, fixed attenuators may be used. To preserve the DOP accuracy, these attenuators must have low PDL, because the PDL generally repolarize the light source. As a good estimation, the DOP error induced by a PDL source when measuring an unpolarized source is $$DOP(\%)=12 \cdot PDL(dB) \qquad (3)$$

For example, for an attenuator with a PDL of 0.1 dB, the induced DOP error is 1.2%.

In addition to measurement of the DOP value, an accurate and fast DOP meter is also important in the manufacturing floors for tuning DOP values of the light sources. For example, by monitoring DOP in real time while adjusting the power balance of the two pump lasers in FIG. 6B, extremely low DOP value for the Raman pump can be achieved. Polarimeters are generally too expensive to be used in production stations, too complicated to operate for less sophisticate production personnel, and not accurate enough for such demanding an application. On the other hand, due to its low cost, simplicity to operate, and high accuracy, the DOP meter based on the present maximum-and-minimum search can be used for such applications.

Figure 8A:
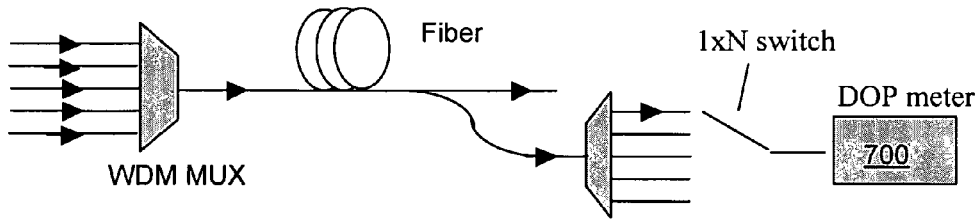
FIGS. 8A and 8B show two exemplary applications of the device in FIG. 7.

A high-speed DOP meter can also be used in optical networks to monitor PMD or optical signal to noise ratio (OSNR). FIG. 8A illustrates one example where an optical switch, such as a 1×N switch, may be used to connect the DOP meter to the N output channels from a WDM demultiplexer in a fiber network to measure the DOP of the WDM channels, one WDM channel at a time. Because PMD in an optical system degrades the DOP of the optical signal, monitoring of the DOP can directly reveal the influence of PMD on the optical signals. As illustrated, the DOP meter 700 shown in FIG. 8A is the DOP meter 700 in FIG. 7. However, a DOP meter different from the DOP meter 700 in FIG. 7 may be used.

On the other hand, in absence of PMD influence, OSNR can also be obtained from the DOP measurement by the following equation:

$$OSNR=10 \log[(P_{max}-P_{min})/(2P_{min})]=\\ 10 \log[DOP/(1-DOP)] \qquad (4)$$

where it is assumed that the signal is totally polarized and the noise is totally unpolarized.

Figure 8B:
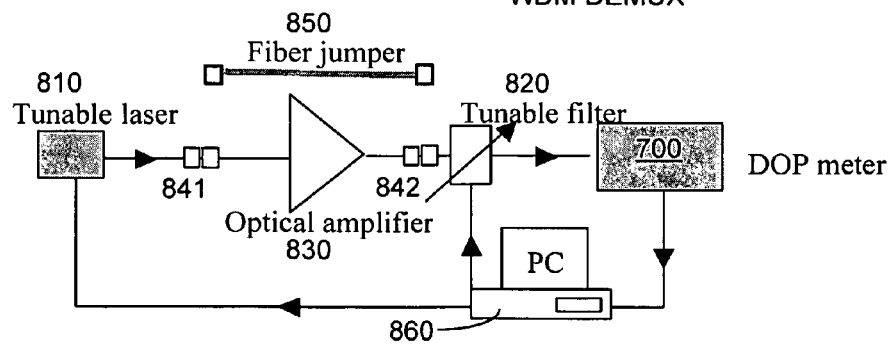

An accurate DOP meter can also be used to measure the noise figure of an amplifier. FIG. 8B shows one exemplary system for measuring the noise figure of an amplifier 830. A laser 810 is used to provide the laser beam for the measurement and an optical bandpass filter 820 is placed before the DOP meter 700 to select the spectral band within which the noise figure is measured. The OSNR of the signal source (i.e., the laser 810) may be first measured without the amplifier 830 by inserting a fiber jumper 850 in the place of the amplifier 830. The result of this measurement based on Eq. (4) is $OSNR_o$ and is used as a reference OSNR. The light that transmits through the optical filter 820 is a reference beam and the OSNR of this reference beam is measured as $OSNR_o$. Two optical connectors 841 and 842 may be used to connect either the fiber jumper 850 or the amplifier 830. Next, the amplifier 830 is inserted in the optical path between the laser 810 and the filter 820 to obtain the measurement of OSNR for the optical signal output from the amplifier 830. This measurement of $OSNR_{amplifier}$ is also based on Eq. (4). The noise figure of the amplifier 830 is the difference between the two OSNR measurements in dB: ($OSNR_{amplifier}$–$OSNR_o$). The optical filter 830 can be selected to limit the bandwidth. In practice, the noise figure can be expressed in a 0.1-nm bandwidth and therefore the effects of the bandwidth and shape of the filter need to be taken into account for the final OSNR value.

The laser 810 may be fixed at a particular laser wavelength and the corresponding filter 820 should have a passband centered at the laser wavelength. Alternatively, as illustrated in FIG. 8B, the laser 810 may be a tunable laser and the filter 820 may be a tunable filter so that both the laser 810 and the filter 820 may be tuned in synchronization with each other to measure the noise figure at different wavelengths, e.g., the noise figures for different WDM channels of the amplifier 830. With the aid of a computer ("PC") or a digital processor 860, the wavelength dependence and power dependence of the noise figure can also be determined. The DOP meter used in FIG. 8B may be the DOP meter 700 in FIG. 7 or a different DOP meter.

A DOP meter is an important instrument for accurate characterization of the DOP values of different light sources for communication, manufacturing, testing and sensing applications. Implementations of the DOP meter based on the maximum and minimum power search method can be configured to achieve one or more advantages such as low cost, simple operation, high speed, low wavelength sensitivity, and calibration free. Such a DOP meter can be implemented to offer high accuracy for both high and low DOP values with less cost, less effort, and less measurement time.

In the above described devices and their variations or modifications, the polarization controller 410 may be implemented in various configurations. Multi-element adjustable polarization controllers described in U.S. Pat. No. 6,576,866 issued to Yao on Jun. 10, 2003 may be used to implement the controller 410. The entire disclosure of U.S. Pat. No. 6,576,866 is incorporated by reference as part of the specification of this application.

For example, the polarization controller may include multiple adjustable polarization elements in various configurations. In one example, three cascaded rotatable waveplates of fixed phase retardation values of 90 degrees, 180 degrees, and 90 degrees, respectively, may be used to form the polarization controller. In a more specific implementation, a half waveplate (HWP) can be placed between two quarter waveplates (QWP) in free space to form the controller. In another implementation, three or more fiber coils which are optically birefringent are used to produce the fixed retardation values of 90 degrees, 180 degrees, and 90 degrees, respectively. Bending of the fiber in each coil introduces stress and thus causes birefringence. The number of turns (length of the light propagation) and the diameter of the each fiber coil (degree of bending) can be set to produce the corresponding fixed phase retardation. The fiber coils may be rotatable to change their relative orientations in their principal axes to adjust the output polarization. In yet another alternative, three electrically controlled electro-optic materials may be used to produce the fixed retardation values of 90 degrees, 180 degrees, and 90 degrees, respectively, without physical motion. Electro-optic crystals such as $LiNbO_3$ may be used. Each electro-optic polarization element can be applied with two control voltages to control and rotate the orientations of their optic axes via the electro-optic effect without physical rotations of the elements.

In other implementations, a Babinet-Soleil compensator can be used as an adjustable polarization element to produce both adjustable retardation and adjustable orientation in a polarization controller. Two movable birefringent wedges can be positioned relative to each other so that their hypotenuse surfaces face each other. The input optical beam is directed to transmit through the hypotenuse surfaces of two wedges. The total optical path length through the wedges and thus the total retardation of the system may be varied by moving two wedges relative to each other. The two wedges may also be rotated together about the direction of the input optical beam to provide the adjustable orientation by a rotation mechanism.

A fiber polarization controller based on the basic mechanism of the Babinet-Soleil compensator can be built by using a rotatable fiber squeezer which is rotatably engaged to the fiber so that the direction at which the squeezer squeezes the fiber can be adjusted. The squeezing produces birefringence in the fiber to control the light polarization. A pressure-applying transducer, such as a piezo-electric transducer, may be engaged to the squeezer to produce a variable pressure and hence a variable birefringence in the fiber.

In yet other implementations of the polarization controller, four or more adjustable polarization elements with fixed relative orientations and variable birefringences may be used. For example, the principal polarizations of two adjacent elements are at about 45 degrees relative to each other. Electro-optic materials and liquid crystals may be used. In an all-fiber implementation, a fiber can be engaged to four fiber squeezers whose squeezing directions are fixed at angles of 0 degree, 45 degree, 0 degree, and 45 degree, respectively. The pressure on each squeezer may be adjusted to change the retardation produced thereby. Such an all-fiber design may be used to reduce the optical insertion loss as compared to other designs and may be used to operate on light of different wavelengths.

A polarization controller with multiple adjustable polarization elements may use a control mechanism to dynamically control the multiple polarization elements by implementing two control mechanisms: a feed-forward control and a feedback control. In one embodiment, the feed-forward control measures the input polarization of the input signal and adjusts the multiple polarization elements to pre-determined settings for producing the desired output polarization. The feedback control measures the output polarization and, in response to the measured output polarization, adjusts the multiple polarization elements around the settings initially set by the feed-forward control to reduce the deviation of the output polarization from the desired output polarization. In another embodiment, the feed-forward control is engaged to control at least two polarization elements while the feedback control is engaged to control at least two polarization elements that are not engaged to be controlled by the feed-forward control. To certain extent, the feed-forward control essentially provides a fast, coarse control of some or all of the polarization elements in response to the input polarization and the feedback control essentially fine tunes the settings of some or all of the polarization elements to reduce the deviation of the output polarization from the desired output polarization. See U.S. Pat. No. 6,576,866.

Only a few examples and implementations are described. However, other implementations, variations, modifications, and enhancements are possible.

What is claimed is:

1. A device for measuring a degree of polarization light, comprising:
 a polarization controller to receive an input beam of light and to control a polarization of the received input beam in response to a control signal;

an optical polarizer placed to receive light output from the polarization controller to produce an optical output;

an optical detector to receive the optical output from the optical polarizer and to produce a detector output that represents an optical cower level of the received optical output; and a feedback unit that receives the detector output and, in response to the optical power level of the received detector output, produces the control signal to control the polarization controller to adjust the polarization of light to the optical polarizer to obtain and measure a maximum transmission and a minimum transmission at the optical detector, the feedback unit comprising a processor that measures the degree of polarization of the input beam of light from the measured maximum transmission and minimum transmission.

2. The device as in claim 1, wherein the feedback unit comprises an electronic circuit that converts the detector output into a feedback signal, and the processor which processes the feedback signal and produces the control signal.

3. The device as in claim 1, wherein the polarization controller comprises a plurality of adjustable polarization elements, and wherein the feedback unit is configured to adjust one adjustable polarization element at a time while keeping other adjustable polarization elements at fixed settings to adjust each of the adjustable polarization elements to search for the maximum transmission and the minimum transmission at the optical detector.

4. The device as in claim 3, wherein the adjustable polarization elements comprise an electrically controlled electro-optic element.

5. The device as in claim 3, wherein the adjustable polarization elements comprise a fiber and a plurality of adjustable fiber squeezers.

6. The device as in claim 3, wherein the adjustable polarization elements comprise a rotatable waveplate.

7. The device as in claim 3, wherein the adjustable polarization elements comprise a fiber coil which is rotatable.

8. The device as in claim 3, wherein the polarization controller further comprises (1) a feed-forward control responsive to an input polarization to the polarization controller to change the adjustable polarization elements to produce a desired output polarization and (2) a feedback control responsive to an output polarization to control the adjustable polarization elements to reduce a deviation of the output polarization from the desired output polarization.

9. A device, comprising:
a polarization controller to receive an input beam of light and to control a polarization of the received input beam in response to a control signal;

an optical polarizer placed to receive light output from the polarization controller to produce an optical output;

an optical detector to receive the optical output from the optical polarizer and to produce a detector output that represents an optical power level of the received optical output;

a feedback unit that receives the detector output and, in response to the optical power level of the received detector output, produces the control signal to control the polarization controller to adjust the polarization of light to the optical polarizer to measure a maximum transmission and a minimum transmission at the optical detector;

a wavelength division multiplexing (WDM) demultiplexer to separate multiple WDM channels; and an optical switch coupled to direct each of the separated multiple WDM channels into the polarization controller, one at a time.

10. A device for measuring a degree of polarization of light, comprising:

a polarization controller to receive an input beam of light and to control a polarization of the received input beam in response to a control signal;

an optical polarizer placed to receive light output from the polarization controller to produce an optical output;

an optical detector to receive the optical output from the optical polarizer and to produce a detector output; and a feedback unit that receives the detector output and, in response to the received detector output, produces the control signal to control the polarization controller to adjust the polarization of light to the optical polarizer to measure a maximum transmission and a minimum transmission at the optical detector, wherein the feedback unit comprises a digital circuit to send control signals to the polarization unit, in response to values of the detector output, to search for a first optical polarization output by the polarization unit that corresponds to the maximum transmission and a second optical polarization output by the polarization unit that corresponds to the minimum transmission, and the digital circuit determines the degree of polarization of the input beam of light incident to the polarization unit by a ratio of a difference in detector output values corresponding to the maximum transmission and the minimum transmission over a sum of detector output values corresponding to the maximum transmission and the minimum transmission.

11. The device as in claim 10, wherein the polarization controller comprises a plurality of adjustable polarization elements, and wherein the feedback unit is configured to adjust one adjustable polarization element at a time while keeping other adjustable polarization elements at fixed settings to adjust each of the adjustable polarization elements to search for the maximum transmission and the minimum transmission at the optical detector.

12. The device as in claim 11, wherein the adjustable polarization elements comprise a fiber and a plurality of adjustable fiber squeezers.

* * * * *

UNITED STATES PATENT AND TRADEMARK OFFICE
CERTIFICATE OF CORRECTION

PATENT NO. : 7,522,785 B2
APPLICATION NO. : 11/291585
DATED : April 21, 2009
INVENTOR(S) : Xiaotian Steve Yao It is certified that error appears in the above-identified patent and that said Letters Patent is hereby corrected as shown below:

<u>In the claims:</u>

At claim 1, column 11, line 5, please replace "cower" with --power--.

Signed and Sealed this

Fifteenth Day of September, 2009

David J. Kappos
*Director of the United States Patent and Trademark Office*